United States Patent
Sharp

(10) Patent No.: US 9,066,205 B2
(45) Date of Patent: Jun. 23, 2015

(54) METHODS, SYSTEMS, AND COMPUTER READABLE MEDIA FOR OPTIMIZATION OF BEARER RESOURCES FOR IMS ROAMING

(71) Applicant: GENBAND US LLC, Frisco, TX (US)

(72) Inventor: Iain E. Sharp, Maidenhead (GB)

(73) Assignee: GENBAND US LLC, Frisco, TX (US)

( * ) Notice: Subject to any disclaimer, the term of this patent is extended or adjusted under 35 U.S.C. 154(b) by 0 days.

(21) Appl. No.: 14/187,210

(22) Filed: Feb. 21, 2014

(65) Prior Publication Data

US 2014/0235235 A1 Aug. 21, 2014

Related U.S. Application Data

(63) Continuation of application No. 13/223,230, filed on Aug. 31, 2011, now Pat. No. 8,660,554.

(60) Provisional application No. 61/389,600, filed on Oct. 4, 2010.

(51) Int. Cl.
| | |
|---|---|
| *H04W 4/00* | (2009.01) |
| *H04M 3/42* | (2006.01) |
| *H04W 8/02* | (2009.01) |
| *H04L 29/06* | (2006.01) |
| *H04W 72/04* | (2009.01) |

(52) U.S. Cl.
CPC ............ *H04W 8/02* (2013.01); *H04L 65/1016* (2013.01); *H04L 65/1083* (2013.01); *H04W 72/04* (2013.01)

(58) Field of Classification Search
CPC    H04L 65/1016; H04L 65/1083; H04W 72/04
USPC ............... 455/432.3, 432.1, 433; 379/202.01, 379/203.01
See application file for complete search history.

(56) References Cited

U.S. PATENT DOCUMENTS

2004/0037407 A1\* 2/2004 Gourraud et al. ........ 379/202.01
2008/0301747 A1\* 12/2008 Yan et al. ...................... 725/118

\* cited by examiner

*Primary Examiner* — Opiribo Georgewill
(74) *Attorney, Agent, or Firm* — Fogarty, L.L.C.

(57) ABSTRACT

Methods, systems, and computer readable media for optimization of bearer resources for IMS roaming are disclosed. According to one aspect a system for optimization of bearer resources for IMS roaming includes a home media resource function controller module (HMRFC) for managing local media resources and for selecting a visited media resource function controller module (VMRFC) to provide media resources to a home subscriber that is roaming in the visited network ("visiting subscriber"), and a VMRFC for managing media resources within the visited network and for providing media resources to the visiting subscriber in response to a request to provide media resources to the visiting subscriber.

12 Claims, 4 Drawing Sheets

METHODS, SYSTEMS, AND COMPUTER READABLE MEDIA FOR OPTIMIZATION OF BEARER RESOURCES FOR IMS ROAMING

PRIORITY CLAIM

This application is a continuation of, and claims priority to, U.S. patent application Ser. No. 13/223,230, filed Aug. 31, 2011, which claims the priority of U.S. Provisional Patent Application No. 61/389,600, filed Oct. 4, 2010; the disclosures of which are incorporated herein by reference in their entirety.

TECHNICAL FIELD

The subject matter described herein relates to methods and systems for efficiently providing home network services to roaming mobile IMS users in a visited network while retaining home network control. More particularly, the subject matter described herein relates to methods, systems, and computer readable media for optimization of bearer resources for IMS roaming.

BACKGROUND

The Internet protocol multimedia subsystem (IMS) architecture is intended to support international roaming by mobile IMS users. When a user roams outside their home network, IMS signaling messages are backhauled to the home network so the user can receive personalized service. Because IMS bearer packets are not required to follow the same path as the signaling messages, the bearer path between the call parties may take a more optimal route that avoids the home network of either party.

In conventional IMS networks, however, if the IMS service wishes to apply a resource function (e.g., tones, announcements, conferencing or transcoding) to the bearer stream, then the bearer path must be routed via the home network, because the home network is the source or location of the function. As a result, the bearer path may take a less optimal route that it would have if it did not need to go through the home network. This leads to sub-optimal use of resources and can create problems with the quality of experience due to high latency.

Accordingly, in light of these disadvantages associated with conventional I MS networks, there exists a need for methods, systems, and computer readable media for optimization of bearer resources for IMS roaming.

SUMMARY

According to one aspect a system for optimization of bearer resources for IMS roaming includes a home media resource function controller module (HMRFC) for managing local media resources and for selecting a visited media resource function controller module (VMRFC) to provide media resources to a home subscriber that is roaming in the visited network ("visiting subscriber"), and a VMRFC for managing media resources within the visited network and for providing media resources to the visiting subscriber in response to a request to provide media resources to the visiting subscriber.

According to another aspect, the subject matter described herein includes a method for optimization of bearer resources for IMS roaming, where the method includes receiving, at a home media resource function controller module (HMRFC) for managing local media resources and for selecting a visited media resource function controller module (VMRFC) to provide media resources to a home subscriber that is roaming in the visited network ("visiting subscriber"), a request for media resources for a visiting subscriber. The method also includes identifying a VMRFC module capable of providing the media resources to the visiting subscriber, and instructing the identified VMRFC module to provide the requested media resources to the visiting subscriber.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for optimization of bearer resources for IMS roaming. In one embodiment, the subject matter disclosed herein provides tools to apply IMS resources in the visited network while retaining home network control, thus avoiding sub-optimal routing of the bearer path through the home network if bearer resources are applied to users roaming outside of their home network.

Reference will now be made in detail to exemplary embodiments of the present invention, examples of which are illustrated in the accompanying drawings. Wherever possible, the same reference numbers will be used throughout the drawings to refer to the same or like parts.

Figure 1:
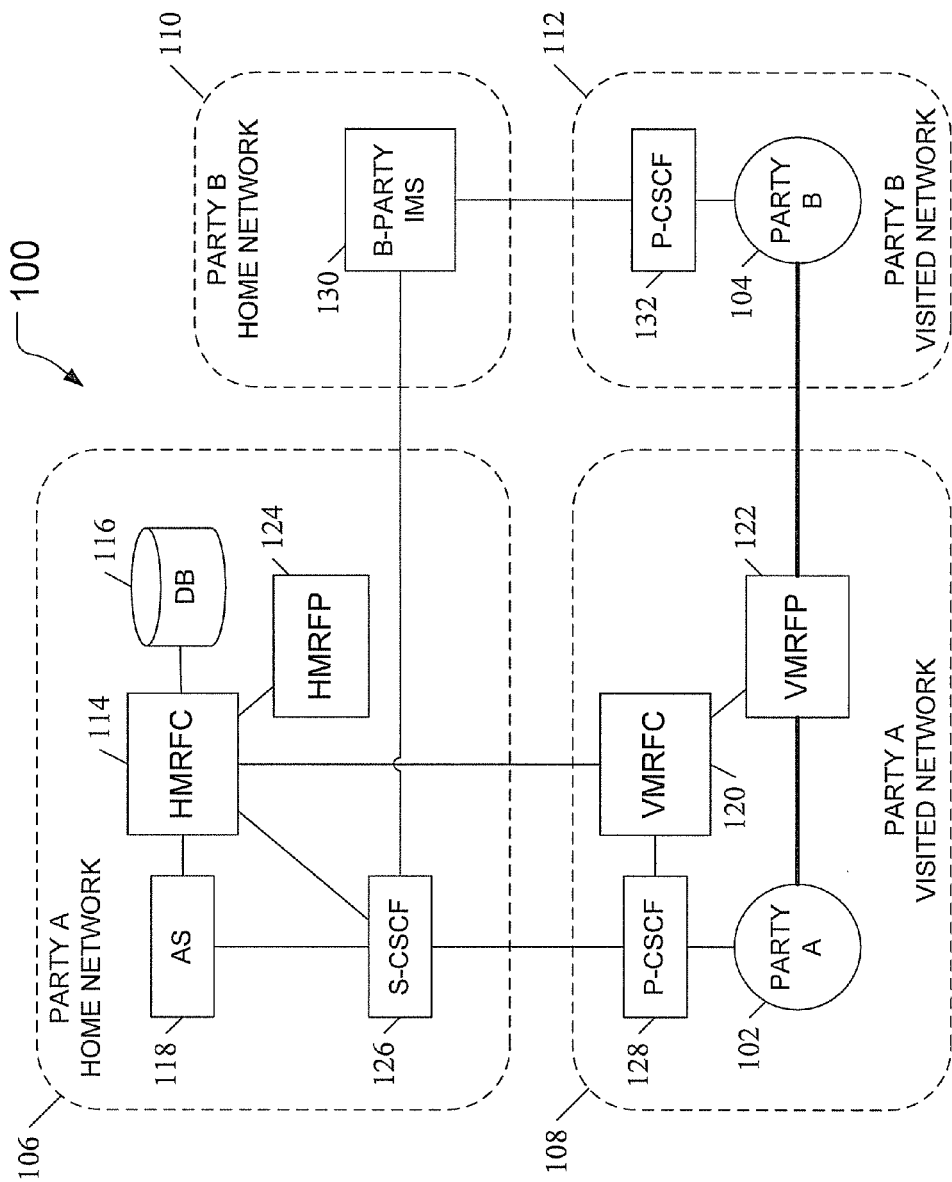
FIG. 1 is a block diagram illustrating an exemplary system for optimization of bearer resources for IMS roaming according to an embodiment of the subject matter described herein.

FIG. 1 is a block diagram illustrating an exemplary system for optimization of bearer resources for IMS roaming according to an embodiment of the subject matter described herein. In the embodiment illustrated in FIG. 1, system 100 includes a telecommunications network that is conceptually divided into sections with respect to two parties to a call, party A 102 and party B 104. System 100 is divided into party A's home network 106, party A's visited network 108, party B's home network 110, and party B's visited network 112. Signaling paths are indicated by thin lines, bearer paths are indicated by thick lines, and network boundaries are indicated by dashed lines.

The subject matter described herein modifies the conventional IMS architecture to introduce several new or modified elements: a home media resource function controller (HMRFC), a visited media resource function controller (VMRFC), and a visited media resource function processor (VMRFP), each of which will now be described in detail.

HMRFC 114 is responsible for selecting a visited media resource function controller to provide media resources or for managing local media resources. In one embodiment, HMRFC 114 contains a database (DB) 116 of VMRFCs that are willing to provide services to subscribers of the home network operator (i.e., the network operator of network 106) that are roaming in the visited network. Database 116 may be populated through manual provisioning or an automatic discovery process described below. HMRFC 114 isolates the IMS applications, such as might reside on application server (AS) 118, in home network 106 from needing to build their own detailed knowledge of the structure of visited network 108. In other words, each AS need only interact with its HMRFC instead of multiple VMRFCs or multiple application servers in the visited network, at least initially. HMRFC 114 acts as a security and control point on the interface to one or more VMRFCs, such as VMRFC 120. In one embodiment, HMRFC 114 is responsible for managing VMRFCs and for collecting data needed for billing and interoperator charging.

VMRFC 120 manages media resource function processors (MRFPs) in the visited network, known as visited media resource function processors (VMRFPs). In the embodiment illustrated in FIG. 1, party A visited network 108 includes one VMRFP 122, but multiple VMRFPs may be present and available. VMRFC 120 is responsible for maintaining a secure interface with one or more HMRFCs in one or more partner networks. In the embodiment illustrated in FIG. 1, VMRFC 120 takes instructions from HMRFC 114 and addresses them to the appropriate local resource function, such as VMRFP 122. In one embodiment, VMRFC 120 is responsible for collecting the data needed for billing and interoperator charging. In one embodiment, VMRFC 120 acts as a security and control point on the interface to HMRFCs.

One or more visited media resource function processors, such as VMRFP 122, are controlled by VMRFC 120 and provide bearer resources or functions, such as providing tones and announcements, providing conferencing, providing transcoding, or other resources or functions.

In the embodiment illustrated in FIG. 1, party A home network 106 also includes a media resource function processor, or MRFP, which is referred to as the home media resource function processor (HMRFP) 124 to distinguish it from the MRFP in the visited network, which is referred to as VMRFP 122. Note, however, that the labels "home" and "visited" are relative, and used herein only to indicate the relationship between a MRFC or MRFP and a party. That is, the "home" MRFC or MRFP for one party could be the "visited" MRFC or MRFP for another party. For this reason, what is labeled as HMRFC 114 in FIG. 1 could have been labeled a VMRFC from the perspective of a subscriber of network 108 who was roaming into network 106. Thus, in one embodiment, HMRFC 114 might perform identical functions as VMRFC 120. In an alternate embodiment, however, an HMRFC and VMRFC may be distinct functions and/or nodes, in which case networks 106 and 108 may each have both an HMRFC node and a VMRFC node.

In the embodiment illustrated in FIG. 1, party A home network 106 includes a serving call session control function (S-CSCF) node 126 and a proxy call session control function (P-CSCF) node 128. Party B home network 110 includes an IMS node 130, and party B visited network 112 includes its own P-CSCF node 132.

In one embodiment, an enhanced IMS registration procedure is used to automatically populate DB 116 for use by HMRFC 114. Two such registration procedures will now be described with reference to FIGS. 2 and 3.

Figure 2:
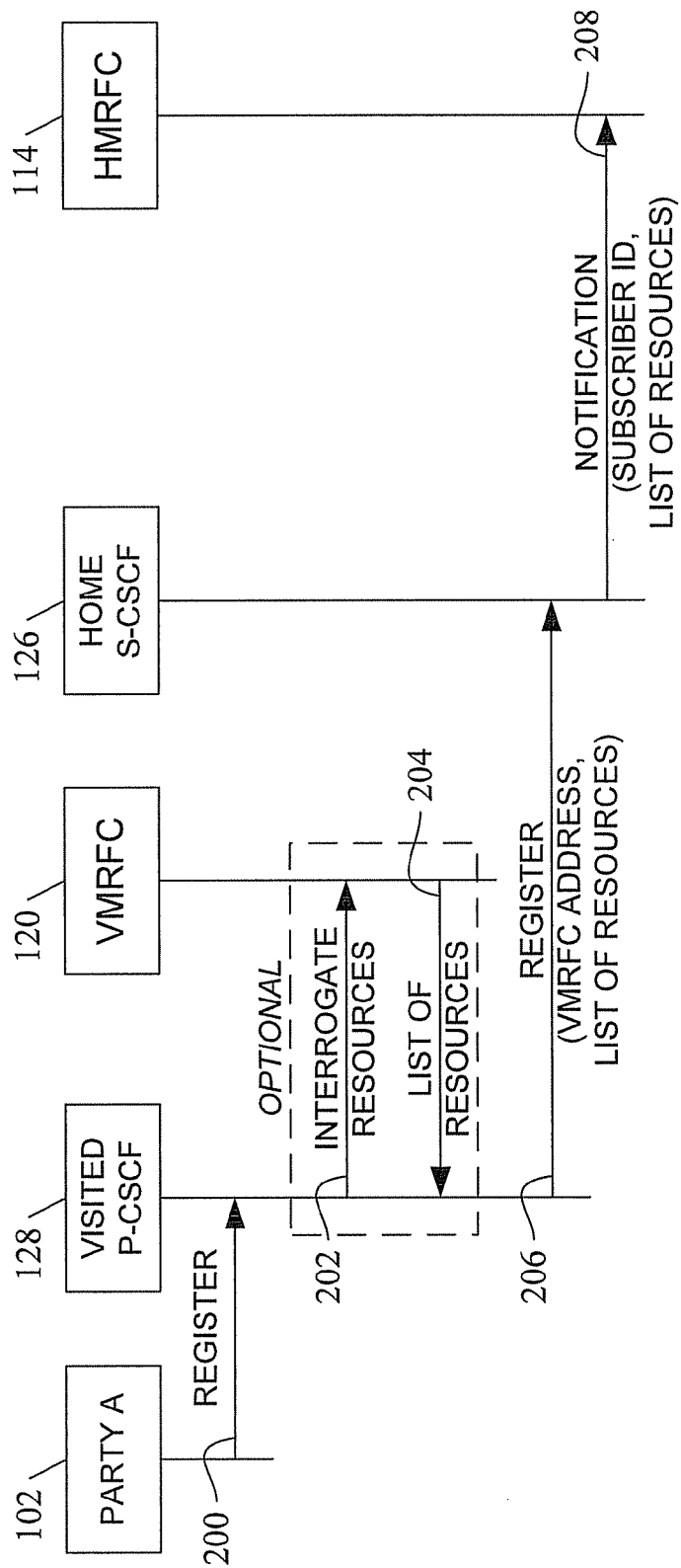
FIG. 2 is an exemplary call flow diagram (ladder diagram) illustrating signaling messages that may be exchanged during a process for optimization of bearer resources for IMS roaming according to an embodiment of the subject matter described herein.

FIG. 2 is an exemplary call flow diagram (ladder diagram) illustrating signaling messages exchanged during a process for optimization of bearer resources for IMS roaming according to an embodiment of the subject matter described herein. FIG. 2 illustrates a process during registration in which a visited P-CSCF provides the home MRFC with a list of resources that the visited network can support. In the embodiment illustrated in FIG. 2, party A 102 registers with visited P-CSCF 124 in the visited network 108 (REGISTER message 200.) If necessary, visited P-CSCF 124 may optionally obtain from VMRFC 116 information listing the resources that the visited network can support (query message 202 and response message 204.) This query and response step may be skipped if P-CSCF 124 already has this information. Visited P-CSCF 124 may then send a registration message 206 to home S-CSCF 122, and home S-CSCF 122 may then send a notification message 208 to HMRFC 114, each message containing the list of resources. In the embodiment illustrated in FIG. 2, message 206 also includes information identifying VMRFC 116, such as the address of VMRFC 116.

Figure 3:
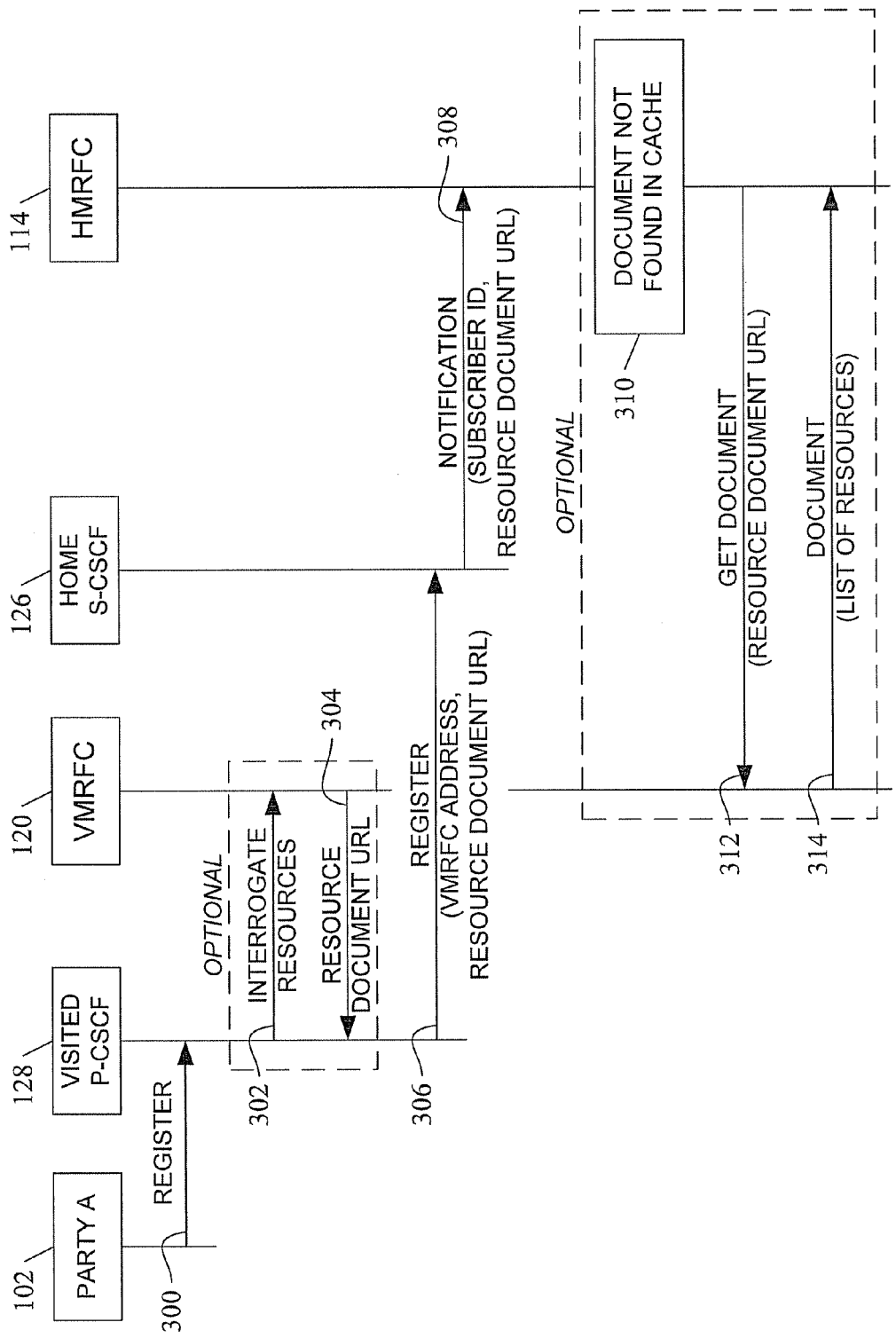
FIG. 3 is an exemplary call flow diagram (ladder diagram) illustrating signaling messages that may be exchanged during a process for optimization of bearer resources for IMS roaming according to another embodiment of the subject matter described herein.

FIG. 3 is an exemplary call flow diagram (ladder diagram) illustrating signaling messages exchanged during a process for optimization of bearer resources for IMS roaming according to another embodiment of the subject matter described herein. In contrast to FIG. 2, where a visited P-CSCF provides the HMRFC with a list of resources that the visited network can support, FIG. 3 illustrates an alternative in which a visited P-CSCF provides the home MRFC with the URL of a resource document that lists the resources that the visited network can support, rather than providing the list itself. In the embodiment illustrated in FIG. 3, party A 102 registers with visited P-CSCF 124 in the visited network 108 (REGISTER message 300.) Visited P-CSCF 124 may know the URL of a resource document that lists available resources, but if not, visited P-CSCF 124 may obtain the URL of the resource document from VMRFC 120 (query message 302 and response message 304.) Visited P-CSCF 124 may then send a registration message 306 that includes the resource document URL to home S-CSCF 122. Home S-CSCF 122 may then send a notification message 308 containing the resource document URL to HMRFC 114.

In one embodiment, HMRFC 114 may maintain a cache of such documents; in this embodiment, HMRFC 114 may determine, at block 310, that the resource document is in the cache, in which case no further action is needed. Alternatively, HMRFC 114 may determine that the resource document is not in the cache and may therefore request the document, identified by its URL, from VMRFC 120. In the embodiment illustrated in FIG. 3, HMRFC 114 sends request 312 to VMRFC 120, and receives from VMRFC 120 a response 314 containing the list of resources.

The method illustrated in FIG. 2 may be referred to as sending the resource list directly while the method illustrated in FIG. 3 may be referred to as sending the resource list indirectly. One advantage to caching URLs or resource documents in HMRFC 114 is that doing so reduces signaling load. In one embodiment, DB 116 does not contain a complete list of resources available for each user, but instead associates a URL for each user. If the URL stored for each user is significantly smaller than the complete list of resources that would otherwise be stored for each user, storing the URLs instead of the complete lists will result in a reduction in the size of DB 116.

In one embodiment, the resource identification includes two parts. The first part is an identifier that shows the identity of the entity managing the resource scheme. The second part is an identifier that shows the particular resource type within that resource scheme. This permits both standardized naming schemes for commonly agreed resource and proprietary naming schemes for resources that operators have distributed by private agreement. For example, a resource identification of the type "ancarrier.com/announcements/en/busy.wav" includes an identifier that shows the identity of the entity managing the resource scheme ("ancarrier.com"), and an identifier that shows the particular resource type within that resource scheme ("announcements/en/busy.wav".) Together, the two parts identify the "user busy" announcement in the corporate style of the "ancarrier" group and in the English language. Operator groups that own multiple national carriers may wish to define their own resource types within their subsidiaries in order to create a branded and consistent user experience. In another example, a resource identification of the type "3gpp.org/announcements/en/busy.wav" includes a first part "3gpp.org" and a second part "announcements/en/busy.way." Together, the two parts identify the "user busy" announcement in English whose semantic contents has been standardized by the body "3gpp.org". However the standardization may only cover the nature of the announcement rather than the exact tone or speakers voice being used. In alternate embodiments, other resource identification schema may be used.

FIGS. 2 and 3 illustrate two examples of auto-population of DB 116 with information about the resources available to roaming subscribers in a visited network. An example of how this information is then used to optimize bearer resources for IMS roaming is shown in FIG. 4.

Figure 4:
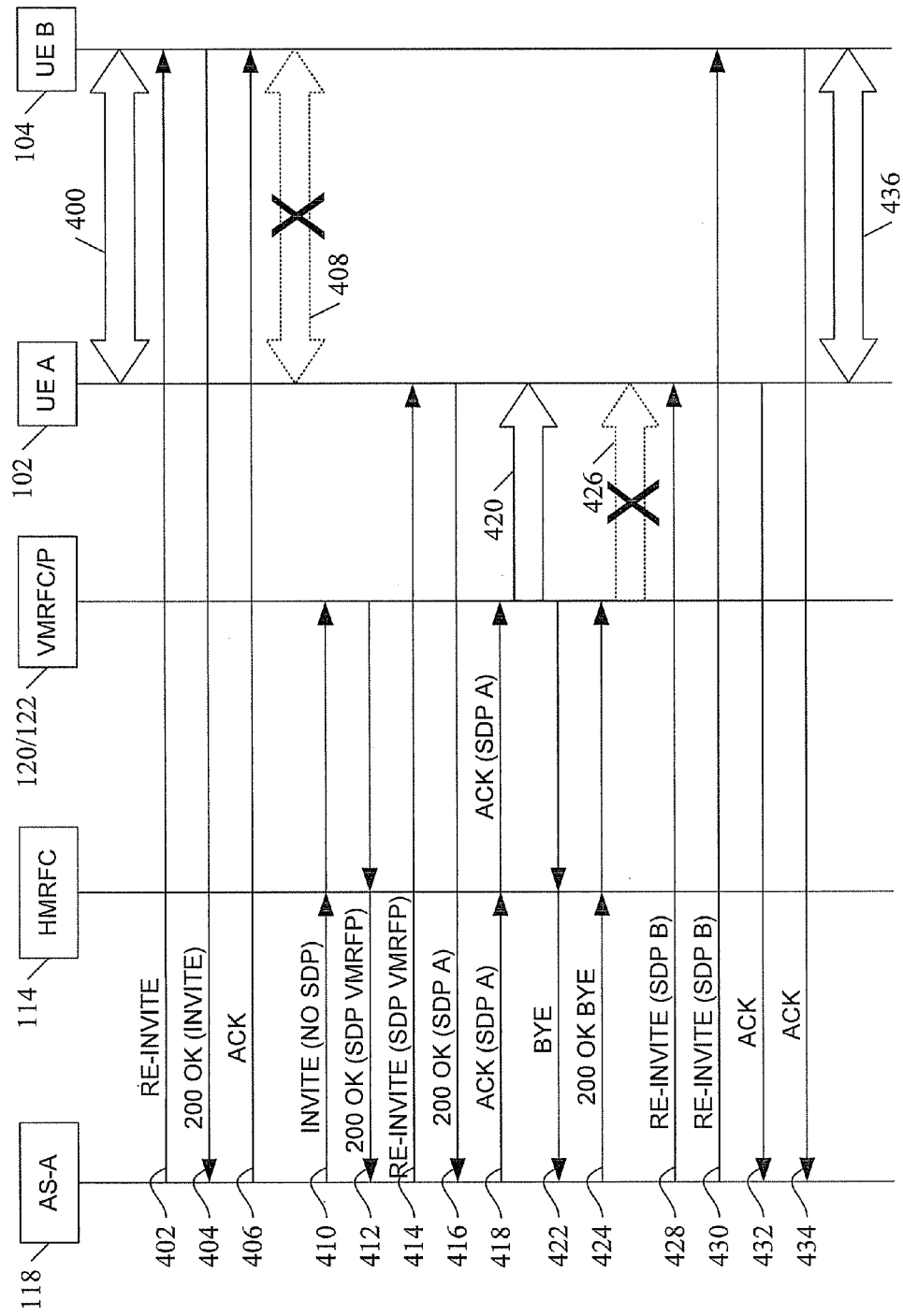
FIG. 4 is an exemplary call flow diagram (ladder diagram) illustrating signaling messages exchanged during a process for optimization of bearer resources for IMS roaming according to yet another embodiment of the subject matter described herein.

FIG. 4 is an exemplary call flow diagram (ladder diagram) illustrating signaling messages exchanged during a process for optimization of bearer resources for IMS roaming according to yet another embodiment of the subject matter described herein. FIG. 4 illustrates an example invocation of resources. This process will now be described with reference to FIGS. 1 and 4.

Referring to FIG. 4, user equipment UE A 102 and UE B 104 have established a media bearer stream 400 between them. In the embodiment illustrated in FIG. 1, for example, bearer stream 400 is the thick black line from party A 102 through VMRFP 122 to party B 104. When application server AS-A 118, which provides resources to user equipment A 102, wishes to invoke a resource, AS-A 118 or home S-CSCF 126 (not shown) may put UE B 104 on hold, e.g., by sending a RE-INVITE message 402 to UE B 104 and setting an SDP attribute appropriately. UE B 104 may respond with a message such as 200 OK message 404, which AS-A 118 may acknowledge (e.g., by sending ACK message 406.) This exchange puts UE B 104 on hold, and the bearer stream between UE A 102 and UE B 104 is suspended, as shown by arrow 408.

Having put UE B 104 on hold, AS-A 118 may now invoke the additional resource. In the embodiment illustrated in FIG. 4, AS-A 118 may send an INVITE message 410 to HMRFC 114 indicating to HMRFC 114 the type of resource being requested. If HMRFC 114 determines from its database that this resource is available in the visited network, HMRFC 114 will forward this request to the relevant VMRFC, such as VMRFC 120. VMRFC 120 may reserve the resources on a VMRFP 122 and return an SDP for the reserved VMRFP resource (200 OK message 412.) This SDP is then sent in a RE-INVITE message 414 to the calling party UE A 102, to which UE A 102 may respond by sending 200 OK message 416. AS-A 118 may then send an acknowledgement message 418 to VMRFC 120 via HMRFC 114. In response, calling party UE A 120 connects to the optimally located resource in the visited network, via bearer path 420.

When the resource is no longer required, it may be released by VMRFP 122 (BYE message 422), to which AS-A 118 responds by sending 200 OK BYE message 424 to VMRFC 120 via HMRFC 114. As a result, the bearer path between VMRFP 122 and UE A 102 is released (arrow 426.) AS-A 118 then reestablishes the normal call path, e.g., by sending RE-INVITEs 428 and 430 to UE A 102 and UE B 104, respectively, and receiving ACK messages 432 and 434 from UE A 120 and UE B 104, respectively. Normal call path 436 is then reestablished.

This architecture means that application servers do not need to consider whether resources are located in the home or visited network, which significantly simplifies the service design. As a fall-back, if the requested resources are not available in the visited network the HMRFC may always connect to an MRFP in the home network, at the cost of a loss of optimization of the bearer path.

The subject matter described herein provides improved efficiency of bearer routing for IMS roaming users, which results in improved quality of experience for the end user due to reduced latency. Furthermore, IMS applications don't need to know the internal details of visited networks in order to access resources there; that function is provided by HMRFC 114. The subject matter described herein provides automatic population of a capabilities database which simplifies network configuration and management, and provides an architecture that supports resource billing and security management of the network to network interfaces in an efficient manner.

It will be understood that various details of the subject matter described herein may be changed without departing from the scope of the subject matter described herein. Furthermore, the foregoing description is for the purpose of illustration only, and not for the purpose of limitation.

What is claimed is:

1. A visited media resource function controller (VMRFC), comprising:
   a processor; and
   a memory coupled to the processor, the memory including program instructions stored thereon that, upon execution by the processor, cause the VMRFC to:
      manage media resources within a visited network, wherein a subscriber, when operating within a home network serviced by a home media resource function controller (HMRFC) becomes a home subscriber, and wherein the subscriber, when roaming in the visited network serviced by the VMRFC, becomes a visiting subscriber;

receive a request from the HMRFC to provide the media resources to the visiting subscriber;

provide the media resources to the visiting subscriber; and provide information about the media resources to the HMRFC by sending an indication of a location of the information to the HMRFC.

2. The VMRFC of claim 1, wherein the program instructions, upon execution by the processor, further cause the VMRFC to provide information about the media resources to the HMRFC in response to a registration request by the visiting subscriber.

3. A visited media resource function controller (VMRFC), comprising:

a processor; and a memory coupled to the processor, the memory including program instructions stored thereon that, upon execution by the processor, cause the VMRFC to:

manage media resources within a visited network, wherein a subscriber, when operating within a home network serviced by a home media resource function controller (HMRFC) becomes a home subscriber, and wherein the subscriber, when roaming in the visited network serviced by the VMRFC, becomes a visiting subscriber;

receive a request from the HMRFC to provide the media resources to the visiting subscriber;

provide the media resources to the visiting subscriber; and provide information about the media resources to the HMRFC in response to a registration request by the visiting subscriber.

4. The VMRFC of claim 3, wherein the program instructions, upon execution by the processor, further cause the VMRFC to provide information about the media resources to the HMRFC by sending an indication of a location of the information to the HMRFC.

5. A non-transitory computer readable medium having stored thereon executable instructions that, when executed by a processor of a visited media resource function controller (VMRFC), cause the VMRFC to:

manage media resources within a visited network, wherein a subscriber, when operating within a home network serviced by a home media resource function controller (HMRFC) becomes a home subscriber, and wherein the subscriber, when roaming in the visited network serviced by the VMRFC, becomes a visiting subscriber;

receive a request from the HMRFC to provide the media resources to the visiting subscriber;

provide the media resources to the visiting subscriber; and provide information about the media resources to the HMRFC by sending an indication of a location of the information to the HMRFC.

6. The non-transitory computer readable medium of claim 5, wherein the program instructions, upon execution by the processor, further cause the VMRFC to provide information about the media resources to the HMRFC in response to a registration request by the visiting subscriber.

7. A non-transitory computer readable medium having stored thereon executable instructions that, when executed by a processor of a visited media resource function controller (VMRFC), cause the VMRFC to:

manage media resources within a visited network, wherein a subscriber, when operating within a home network serviced by a home media resource function controller (HMRFC) becomes a home subscriber, and wherein the subscriber, when roaming in the visited network serviced by the VMRFC, becomes a visiting subscriber;

receive a request from the HMRFC to provide the media resources to the visiting subscriber;

provide the media resources to the visiting subscriber; and provide information about the media resources to the HMRFC in response to a registration request by the visiting subscriber.

8. The non-transitory computer readable medium of claim 7, wherein the program instructions, upon execution by the processor, further cause the VMRFC to provide information about the media resources to the HMRFC by sending an indication of a location of the information to the HMRFC.

9. A method, comprising:

managing, by a visited media resource function controller (VMRFC), media resources within a visited network, wherein a subscriber, when operating within a home network serviced by a home media resource function controller (HMRFC) becomes a home subscriber, and wherein the subscriber, when roaming in the visited network serviced by the VMRFC, becomes a visiting subscriber;

receiving, by the VMRFC, a request from the HMRFC to provide the media resources to the visiting subscriber;

providing, by the VMRFC, the media resources to the visiting subscriber; and providing, by the VMRFC, information about the media resources to the HMRFC by sending an indication of a location of the information to the HMRFC.

10. The method of claim 9, further comprising providing, by the VMRFC, information about the media resources to the HMRFC in response to a registration request by the visiting subscriber.

11. A method, comprising:

managing, by a visited media resource function controller (VMRFC), media resources within a visited network, wherein a subscriber, when operating within a home network serviced by a home media resource function controller (HMRFC) becomes a home subscriber, and wherein the subscriber, when roaming in the visited network serviced by the VMRFC, becomes a visiting subscriber;

receiving, by the VMRFC, a request from the HMRFC to provide the media resources to the visiting subscriber;

providing, by the VMRFC, the media resources to the visiting subscriber; and providing, by the VMRFC, information about the media resources to the HMRFC in response to a registration request by the visiting subscriber.

12. The method of claim 11, further comprising providing, by the VMRFC, information about the media resources to the HMRFC by sending an indication of a location of the information to the HMRFC.

* * * * *